(12) United States Patent
Stappers

(10) Patent No.: US 8,048,482 B2
(45) Date of Patent: Nov. 1, 2011

(54) PAINT COMPRISING A LIQUID PHASE AND AN ACTIVE POWDER PHASE

(75) Inventor: Franciscus Hubertus Maria Stappers, Wageningen (NL)

(73) Assignee: Akzo Nobel Coatings International B.V., Arnhem (NL)

( * ) Notice: Subject to any disclaimer, the term of this patent is extended or adjusted under 35 U.S.C. 154(b) by 699 days.

(21) Appl. No.: 10/567,331

(22) PCT Filed: Aug. 12, 2004

(86) PCT No.: PCT/EP2004/009140
§ 371 (c)(1),
(2), (4) Date: Mar. 1, 2006

(87) PCT Pub. No.: WO2005/017054
PCT Pub. Date: Feb. 24, 2005

(65) Prior Publication Data
US 2006/0222765 A1    Oct. 5, 2006

(51) Int. Cl.
B05D 1/12 (2006.01)
C08F 283/04 (2006.01)
C08G 18/08 (2006.01)

(52) U.S. Cl. .......... 427/180; 525/424; 524/839

(58) Field of Classification Search .......... 427/180; 525/424; 524/589, 839
See application file for complete search history.

(56) References Cited

U.S. PATENT DOCUMENTS

| | | | | |
|---|---|---|---|---|
| 2,584,133 A * | 2/1952 | Koochembere | | 411/432 |
| 2,596,136 A * | 5/1952 | Wentworth | | 428/91 |
| 3,666,597 A * | 5/1972 | Parnell | | 156/305 |
| 4,871,822 A | 10/1989 | Brindopke et al. | | |
| 5,039,718 A * | 8/1991 | Ashley et al. | | 523/202 |
| 5,084,536 A * | 1/1992 | Brindopke et al. | | 526/218.1 |
| 5,348,763 A | 9/1994 | Laroche | | |
| 5,370,818 A | 12/1994 | Schleifstein | | |
| 5,721,051 A * | 2/1998 | White et al. | | 428/413 |
| 5,869,559 A * | 2/1999 | Simpson et al. | | 524/497 |
| 5,947,632 A * | 9/1999 | Pirotta et al. | | 404/9 |
| 5,972,423 A | 10/1999 | Abbey et al. | | |
| 6,201,038 B1 * | 3/2001 | Waller et al. | | 523/109 |
| 6,316,535 B1 | 11/2001 | Caldwell et al. | | |
| 6,433,239 B1 * | 8/2002 | VanDijk | | 585/640 |
| 6,537,672 B1 | 3/2003 | Dittfurth et al. | | |
| 6,639,046 B1 * | 10/2003 | Van Dijk | | 528/293 |
| 6,669,835 B1 | 12/2003 | Honnick | | |
| 2002/0161135 A1 * | 10/2002 | Berg et al. | | 525/410 |
| 2003/0110931 A1 * | 6/2003 | Aghajanian et al. | | 89/36.01 |
| 2003/0180508 A1 * | 9/2003 | McArdle et al. | | 428/195.1 |
| 2004/0024116 A1 | 2/2004 | Honnick | | |

FOREIGN PATENT DOCUMENTS

| | | |
|---|---|---|
| EP | 0 160 824 | 11/1985 |
| EP | 0 389 060 B1 | 9/1990 |
| EP | 0 448 224 A1 | 2/1991 |
| EP | 0 859 017 A1 | 8/1998 |
| EP | 1 054 046 A2 | 11/2000 |
| JP | A 63-312317 | 12/1988 |
| JP | A 03-189623 | 8/1991 |
| JP | A 05-111669 | 5/1993 |
| WO | WO 93/17060 | 9/1993 |
| WO | WO 94/28033 | 12/1994 |
| WO | WO 00/64959 | 11/2000 |

OTHER PUBLICATIONS

Wicks. Organic Coatings: Science and Technology. 1999.*

* cited by examiner

Primary Examiner — Milton I Cano
Assistant Examiner — Jessica Paul
(74) Attorney, Agent, or Firm — Kenyon & Kenyon LLP

(57) ABSTRACT

Coating composition comprising a liquid first phase comprising one or more polymer binder components having functional groups capable of cross-linking by electron pair exchange, and a second phase which is a powder material, such as sand, comprising one or more compounds capable of activating crosslinking of the binder components in the liquid phase after the second phase is exposed to the first phase. The activating compound in the second phase may include a Lewis acid or Lewis base. Alternatively, the liquid phase comprises a compound which is reactive with the activating compound in the powder phase to form a Lewis base or Lewis acid. Method of applying a coating composition curable by cross-linking chemistry based on electron pair exchange, wherein after application of a layer of the coating composition on a substrate, a powder material comprising one or more cross-linking activating compounds is sprinkled over the wet layer. The thickness of the freshly applied coating layer is less than the particle size of at least a part of the powder material. After sprinkling the powder material over the coating layer, a second coating layer is applied.

18 Claims, No Drawings

PAINT COMPRISING A LIQUID PHASE AND AN ACTIVE POWDER PHASE

The invention relates to a coating composition comprising a liquid first phase comprising one or more polymer binder components having functional groups capable of cross-linking, and a separate second phase which is a dry, sprinkleable powder material comprising one or more compounds capable of activating cross-linking of the binder components in the liquid phase after the first and second phases are exposed to each other. The invention also pertains to a method for application of such a coating composition.

U.S. Pat. No. 5,348,763 discloses a road marking paint comprising a polymeric binder which is cured by sprinkling peroxide bearing beads onto the wet paint. EP-A 0 389 060 discloses a powder comprising dibenzoyl peroxide used to cure a fresh paint layer based on acrylic binders. Peroxides are detrimental to health and the environment and for instance may not be sprinkled with bare hands. Moreover, peroxides only initiate radical polymerisation and thus are limited to specific types of binders. Oxygen in the air can cause premature inhibition of the radical polymerisation, resulting in a tacky layer with a low degree of curing.

The object of the invention is to provide a coating system which allows a balance of easy and safe application on the one hand and fast curing on the other, and which results in a durable coating layer.

The object of the invention is achieved with a coating composition comprising one or more polymer binders which are cross-linkable by polar reaction and at least one catalyst, the cross-linkable polymer binders being comprised in a liquid phase and a separate dry sprinkleable powder phase comprising at least part of the catalyst and/or of a precursor of the catalyst which can form the catalyst in reaction with a co-reactive compound in the liquid phase after the liquid phase and the powder phase are exposed to each other. Polar reactions are non-radical reactions. No radical formation takes place.

Polar reactions take place between nucleophiles and electrophiles and involve electron pair exchange.

Such cross-linking cannot be inhibited by oxygen and can be controlled more effectively than radical copolymerisation reactions. Moreover, since cross-linking only takes place after addition of the powder phase, a very long pot life, up to about 50 hours, can be obtained.

EP-A 1 054 046 discloses a two-component coating system wherein one or both of the components comprise a filler which can have an accelerating effect. Both components are aqueous. The use of a sprinkleable dry powder phase is not disclosed.

The catalyst in the powder phase can for instance include at least one Lewis acid or Lewis base. A Lewis acid is defined as a compound capable of accepting an electron pair donated by a Lewis base. Lewis acids include, but are not limited to, Brönsted acids (which are, in turn, defined as proton donors), whereas Lewis bases include, among others, Brönsted bases (defined as proton acceptors). Suitable metal complexes or metal salts can also act as Lewis acids or bases, respectively.

The liquid first phase can for instance be a two-component or multi-component composition. Two-component coating compositions are coating compositions comprising two or more reactive compounds which are packed and stored separately to prevent premature cross-linking. Just before or during application of the coating, the components are mixed.

Such a two-component system can for instance be based on isocyanate cross-linking chemistry, using polyisocyanates to cross-link compounds comprising functional groups with active hydrogens, such as polythiols or polyols.

Suitable polyisocyanates are for instance aliphatic, cycloaliphatic, and aromatic isocyanates, with an average isocyanate functionality of for instance about 2.5 to about 5. The polyisocyanate can for instance be a biuret, urethane, uretdione or isocyanurate derivative. Examples of suitable aliphatic diisocyanates are trimethylene diisocyanate, tetramethylene diisocyanate, pentamethylene diisocyanate, hexamethylene diisocyanate, 1,2-propylene diisocyanate, 1,2-butylene diisocyanate, 2,3-butylene diisocyanate, 1,3-butylene diisocyanate, ethylidene diisocyanate, butylidene diisocyanate, 4,4'-bis(isocyanate hexyl)methane, bis(2-isocyanate-ethyl)fumarate, 2,6-diisocyanate methyl caproate, 2,2,4-(2,2,4)-trimethyl hexamethylene diisocyanate, and dimer acid diisocyanates. Suitable cycloaliphatic diisocyanates are for instance isophorone diisocyanate, 1,3-cyclopentane diisocyanate, 1,4-cyclopentane diisocyanate, 1,2 diisocyanate, or methylcyclohexylene diisocyanate. Suitable aromatic diisocyanates are for instance m-phenylene diisocyanate, p-phenylene diisocyanate, and 4,4'-diphenyl diisocyanate. Also 4,4'-diphenylene methane diisocyanate, 2,4-tolylene diisocyanate, 2,6-tolylene diisocyanate, 4,4'-toluidene diisocyanate or 1,4 xylylene diisocyanate can be used. Aromatic diisocyanates are for instance dianisidine diisocyanate, 4,4'-diphenylether diisocyanate or chlorodiphenylene diisocyanate. Suitable triisocyanates are for instance triphenyl methane-4, 4'-4"-triisocyanate, 1,3,5-triisocyanate benzene or 2,4,6-triisocyanate toluene. Tetraisocyanates, such as 4,4'-diphenyl dimethylmethane 2,2',5,5'-tetraisocyanate, can also be used. Other suitable isocyanate cross-linking agents are for example polymerised isocyanates, e.g. tolylene diisocyanate dimers, trimers and the like, or polyisocyanates which are derived from a polyol, including for example glycols such as ethylene glycol or propylene glycol; glycerol, trimethylol propane, hexane triols, pentaerythritol or monoethers, such as diethylene glycol or tripropylene glycol. Also suitable are polyether polyols or polyester polyols, e.g. isocyanate-terminated prepolymers, which are the reaction product of polyethers with an excess of polyisocyanates.

The polyol used in the coating composition can be a polyester polyol, a polyacrylate polyol, a polyester/polyacrylate hybrid polyol, a polyether polyol, a polyurethane polyol, or any other suitable hydroxy-functional polymer or mixture of polymers. Polyacrylate polyols and polyester polyols are preferred.

The polyols have on average two or more hydroxy groups per molecule, preferably three or more. Preferably, the polyol or mixture of polyols has a hydroxy value from 30 to 300 mg KOH/gram polyol, more preferably between 50 and 200 mg KOH/gram polyol. Most preferably, the hydroxy value is between 75 and 200 mg KOH/gram polyol.

Suitable polyols may for instance have an acid number below 75 mg KOH/gram polyol, preferably between 5 and 50 mg KOH/g.

A hydroxy-functional polyester can be prepared by the polyesterification of polycarboxylic acids, their anhydrides or dialkylesters with polyalcohols. In order to achieve hydroxy functionality in the resulting polyester, an excess of the hydroxy component should be used. Depending on the conversion of the functional groups, polyesters with hydroxy as well as carboxylic acid-functional groups can be prepared.

Hydroxy-functional monomers or oligomers suitable for use in polyester synthesis include dihydric alcohols, or diols, trihydric alcohols, or triols, or higher alcohols. Suitable diols include (cyclo)alkane diols, for example, ethane diol, 1,2- and 1,3-propane diol, 1,2-, 1,3- and 1,4-butane diol, 1,5-pentane diol, 1,6-hexane diol, neopentyl glycol, 1,4-cyclohexane dimethanol, 1,2- and 1,4-cyclohexane diol, 2-ethyl-2-butyl-propane diol. Glycol ethers, such as diethylene glycol, triethylene glycol, tetraethylene glycol, dipropylene glycol, tripropylene glycol, polyethylene glycol, polypropylene glycol or polybutylene glycol, can also be used. Reaction products of the aforementioned diols with ε-caprolactone can likewise be used as diols. Triols or higher alcohols suitable for polyester synthesis are for example glycerol, trimethylol propane, pentaerythritol, dipentaerythritol, and sorbitol, and reaction products of these alcohols with ethylene oxide and/or propylene oxide or with ε-caprolactone. Monoalcohols such as ethanol, 1- and 2-propanol, etc., can be used as chain stoppers.

Acid-functional compounds suitable for polyester synthesis include dicarboxylic acids and/or anhydrides thereof such as phthalic acid, phthalic anhydride, isophthalic acid, tetrahydrophthalic acid, tetrahydrophthalic anhydride, hexahydrophthalic acid, hexahydrophthalic anhydride, maleic anhydride, fumaric acid, succinic acid, succinic anhydride, adipic acid, dodecanedioic acid, and hydrogenated dimeric fatty acids.

For obtaining excellent hydrolytic stability as well as excellent mechanical properties acids such as isophthalic acid, terephthalic acid, 1,4-cyclohexane dicarboxylic acid, and hexahydrophthalic anhydride can be selected.

Higher-functional carboxylic acids or anhydrides thereof, for example trimellitic acid and trimellitic anhydride, can also be used. Optionally, monocarboxylic acids may be used in the polyester synthesis, for example benzoic acid, cyclohexanecarboxylic acid, 2-ethylhexanoic acid, hexanoic acid, octanoic acid, decanoic acid, dodecanoic acid, natural and synthetic fatty acids.

Polyacrylic polyols can be made by addition polymerisation of ethylenically unsaturated compounds. Suitable unsaturated compounds include olefinically unsaturated esters comprising at least one maleic acid di(cyclo)alkyl ester having 1 to 12, preferably 1 to 8, and more preferably 1 to 4 carbon atoms in the (cyclo)alkyl radical; maleic acid dimethyl ester, maleic acid diethyl ester, maleic acid di-n-butyl ester, maleic acid di-2-ethylhexyl ester, maleic acid di-n-decyl ester, maleic acid di-n-dodecyl ester, and maleic acid dicyclohexyl ester are suitable examples. Further suitable unsaturated compounds are (cyclo)alkyl ester of acrylic and/or methacrylic acid having 1 to 18, preferably 1 to 12, and more preferably 1 to 9 carbon atoms in the (cyclo)alkyl radical, for example methyl(meth)acrylate, ethyl(meth)acrylate, propyl (meth)acrylate, isopropyl(meth)acrylate, n-butyl(meth)acrylate, isobutyl(meth)acrylate, tert-butyl(meth)acrylate, cyclohexyl(meth)acrylate, 2-ethylhexyl(meth)acrylate, isobornyl (meth)acrylate, 3,3,5-tri-methylcyclohexyl(meth)acrylate, stearyl(meth)acrylate, lauryl(meth)acrylate, and benzyl (meth)acrylate. Aromatic olefinically unsaturated monomers, such as styrene, (α)-methylstyrene, and vinyl toluene, can also be used.

Further examples of suitable unsaturated monomers are the hydroxyalkyl esters of acrylic and/or methacrylic acid having 2 to 6 carbon atoms in the hydroxyalkyl radical, and/or reaction products thereof with ε-caprolactone, as well as the addition products of acrylic and/or methacrylic acid and monoepoxy compounds, hydroxyethyl acrylate, hydroxyethyl methacrylate, hydroxypropyl acrylate, hydroxypropyl methacrylate, hydroxybutyl acrylate and/or hydroxybutyl methacrylate. The reaction products of (meth)acrylic acid with monoepoxy compounds, which can also turn into OH groups, are also suitable. Examples of suitable monoepoxides are Cardura E10® (Shell), 2-ethylhexylglycidyl ether, and glycidol (1,2-epoxy-3-propanol).

Ethylenically unsaturated carboxylic acids are another class of suitable unsaturated monomers. These include (meth) acrylic acid, maleic acid, fumaric acid, and maleic and/or fumaric acid semi-esters having 1 to 18 carbon atoms in the alcohol radical.

Further ethylenically unsaturated compounds are, for example, β-olefins such as 1-octene or 1-decene; vinyl esters such as vinyl acetate, vinyl propionate, vinyl butyrate, VeoVa® 9 and VeoVa® 10 (both available from Shell), and other vinyl compounds such as N-vinyl pyrrolidone, N-vinyl caprolactam, and N-vinyl carbazole.

Polyester/polyacrylate hybrid binders can be prepared by preparing a polyester oligomer using ethylenically unsaturated acids, unsaturated alcohols, unsaturated fatty acids or derivatives thereof such as anhydrides or esters, in particular conjugated unsaturated fatty acids. Unsaturation can also be provided by an unsaturated monoisocyanate, for example dimethyl-m-isopropenyl benzyl isocyanate, after the polymer formation. It is also possible to prepare a carboxylic acid groups-containing polyester, followed by reaction with an oxiran groups-containing monomer such as allyl glycidyl ether or glycidyl methacrylate. Examples of unsaturated alcohols are glycerol monoallyl ether, trimethylol propane monoallyl ether, butene diol and/or dimethylol propionic acid monoallyl ether. Examples of unsaturated acids include maleic acid, muconic acid, crotonic acid, citraconic acid, and itaconic acid. Preference is given to a partially unsaturated hydroxy-functional polyester containing 0.05 to 0.5 ethylenically unsaturated group per molecule.

The polyester/polyacrylate hybrid resin is obtained by the addition polymerisation of radically polymerisable unsaturated monomers in the presence of the partially unsaturated hydroxy-functional polyester described hereinbefore. In this process, the addition polymer is linked to the polyester resin by means of grafting onto the unsaturated groups in the polyester. By the term "grafting" is meant an addition polymerisation reaction to a degree of more than 0% (to a maximum of 100%) of radically polymerisable monomers on the unsaturated bonds in the polyester resin. Both the polyester and the acrylic portions of the hybrid composition can comprise sulphonate and/or carboxylate groups and polyalkyleneoxide groups. Alternatively, all the sulphonate and/or carboxylate groups and polyalkylenoxide groups can be present in the polyester or the acrylic part of the hybrid composition.

Alternatively, or additionally, the composition can comprise one or more further types of polyols such as polyurethane polyols, polyether polyols or hybrids thereof.

Examples of polythiols suitable for cross-linking by isocyanates are for instance polythiols prepared by reacting hydroxy group-containing compounds with thiol group-containing acids, such as 3-mercaptopropionic acid, 2-mercaptopropionic acid, thio-salicylic acid, mercaptosuccinic acid, mercaptoacetic acid, or cysteine. Examples of suitable hydroxy group-containing compounds are diols, triols, and tetraols, such as 1,4-butane diol, 1,6-hexane diol, 2,2-dimethyl-1,3-propane diol, 2-ethyl-2-propyl-1,3-propane diol, 1,2-, 1,3-, and 1,4-cyclohexane diols, and the corresponding cyclohexane dimethanol, 1,1,1-trimethylol propane, 1,2,3-trimethylol propane, and pentaerythritol. Examples of compounds prepared according to such a method include pentaerythritol tetrakis(3-mercapto propionate), pentaerythritol tetrakis(2-mercapto acetate), trimethylol propane tris(3-mercapto propionate), trimethylol propane tris(2-mercapto propionate), and trimethylol propane tris(2-mercapto acetate).

Good results have been obtained with trimethylol propane tris(3-mercapto propionate) and pentaerythritol tetrakis(3-mercapto propionate).

A further example of a compound prepared according to such a method consists of a hyperbranched polyol core based on a starter polyol, e.g., trimethylol propane, and dimethylol propionic acid. This polyol is subsequently esterified with 3-mercaptopropionic acid and isononanoic acid. These methods are described in European patent application EP-A 0 448 224 and International patent application WO 93/17060.

Other syntheses to prepare compounds comprising at least two thiol-functional groups involve:
the reaction of an aryl or alkyl halide with NaHS to introduce a pendent thiol group into the alkyl and aryl compounds, respectively;
the reaction of a Grignard reagent with sulphur to introduce a pendent thiol group into the structure;
the reaction of a polymercaptan with a polyolefin according to a Michael addition reaction, a nucleophilic reaction, an electrophilic reaction or a radical reaction;
the reaction of a polyisocyanate with a thiol-functional alcohol, and
the reduction of disulphides.

The compound comprising at least one thiol-functional group and one hydroxy-functional group may for example have a structure according to the following formula: $T[(C_3H_6O)_nCH_2CHOHCH_2SH]_3$, with T being a triol such as trimethylol propane or glycerol. An example of such a compound is commercially available from Henkel under the trademark Henkel Capcure® 3/800.

Alternatively, the isocyanate reactive compound comprising at least one thiol group is a resin having as a polyester resin, polyurethane resin, polyacrylate resin, or polyether resin as its backbone. These isocyanate-reactive compounds may then also comprise hydroxy groups.

The isocyanate-reactive compound comprising at least one thiol group can be a polyester prepared from (a) at least one polycarboxylic acid or reactive derivatives thereof, (b) at least one polyol, and (c) at least one thiol-functional carboxylic acid. The polyesters preferably possess a branched structure. Branched polyesters are conventionally obtained through condensation of polycarboxylic acids or reactive derivatives thereof, such as the corresponding anhydrides or lower alkyl esters, with polyalcohols, when at least one of the reactants has a functionality of at least 3.

Examples of suitable polycarboxylic acids or reactive derivatives thereof are tetrahydrophthalic acid, tetrahydrophthalic anhydride, hexahydrophthalic acid, hexahydrophthalic anhydride, methyl hexahydrophthalic acid, methyl hexa-hydrophthalic anhydride, dimethylcyclohexane dicarboxylate, 1,4-cyclohexane dicarboxylic acid, 1,3-cyclohexane dicarboxylic acid, phthalic acid, phthalic anhydride, isophthalic acid, terephthalic acid, 5-tert. butyl isophthalic acid, trimellitic anhydride, maleic acid, maleic anhydride, fumaric acid, succinic acid, succinic anhydride, dodecenyl succinic anhydride, dimethyl succinate, glutaric acid, adipic acid, dimethyl adipate, azelaic acid, and mixtures thereof.

Examples of suitable polyols include trimethylol propane, trimethylol ethane, glycerol, 1,2,6-hexanetriol, ethylene glycol, 1,2-propylene glycol, 1,3-propylene glycol, 2-methyl-propane-1,3-diol, neopentyl glycol, 2-butyl-2-ethyl-1,3-propane diol, cyclohexane-1,4-dimethylol, the monoester of neopentyl glycol and hydroxypivalic acid, hydrogenated Bisphenol A, 1,5-pentane diol, 3-methyl-pentane diol, 1,6-hexane diol, 2,2,4-trimethyl pentane-1,3-diol, dimethylol propionic acid, pentaerythritol, di-trimethylol propane, dipentaerythritol, and mixtures thereof.

Examples of suitable thiol-functional organic acids include 3-mercaptopropionic acid, 2-mercaptopropionic acid, thiosalicylic acid, mercaptosuccinic acid, mercaptoacetic acid, cysteine, and mixtures thereof.

Optionally, monocarboxylic acids and monoalcohols may be used in the preparation of the polyesters. Preferably, $C_4$-$C_{18}$ monocarboxylic acids and $C_6$-$C_8$ monoalcohols are used. Examples of the $C_4$-$C_{18}$ monocarboxylic acids include pivalic acid, hexanoic acid, heptanoic acid, octanoic acid, nonanoic acid, 2-ethylhexanoic acid, isononanoic acid, decanoic acid, lauric acid, myristic acid, palmitic acid, isostearic acid, stearic acid, hydroxystearic acid, benzoic acid, 4-tert. butyl benzoic acid, and mixtures thereof. Examples of the $C_6$-$C_{18}$ monoalcohols include cyclohexanol, 2-ethylhexanol, stearyl alcohol, and 4-tert. butyl cyclohexanol.

Good results can also be obtained with an aqueous thiol-functional polyurethane dispersion which is obtainable by first preparing an isocyanate-functional polyurethane from diols, diisocyanates, and building blocks containing groups which facilitate the stabilisation of the resin in an aqueous dispersion, followed by reaction of the isocyanate-functional polyurethane with a polyfunctional thiol in a base-catalysed addition reaction, followed by dispersion in water.

The isocyanate-reactive compound comprising at least one thiol group can be a thiol-functional polyacrylate. Such a polyacrylate is derived from hydroxy-functional acrylic monomers, such as hydroxyethyl(meth)acrylate, hydroxypropyl(meth)acrylate, hydroxybutyl(meth)acrylate, other acrylic monomers such as (meth)acrylic acid, methyl(meth)acrylate, butyl(meth)acrylate, optionally in combination with a vinyl derivative such as styrene, and the like, or mixtures thereof, wherein the terms (meth)acrylate and (meth)acrylic acid refer to both methacrylate and acrylate, as well as methacrylic acid and acrylic acid, respectively. The thiol group is introduced by the reaction product of dimethyl-m-isopropenyl benzyl isocyanate and mercaptoethanol. Alternatively, glycidyl methacrylate is introduced into the polymer to prepare an epoxy-functional polyacrylate. The epoxy groups are then reacted with suitable thiol-functional organic acids such as mentioned above. The polyacrylate is prepared by conventional methods, for instance by the slow addition of appropriate monomers to a solution of an appropriate polymerisation initiator, such as an azo or peroxy initiator.

Also included in the coating compositions of the invention may be di-, tri-, or higher thiol-functional diluents such as ethane dithiol or bis-beta-mercapto-ethyl sulphide. Preference is given to the use of higher-molecular weight thiol-functional compounds, which can be obtained by reaction of a polythiol-functional compound with a polyisocyanate.

Preferably, the isocyanate-reactive compound comprising at least one thiol group is derived from a polyester compound. Examples thereof include the above-mentioned reaction product of hydroxyl group-containing compounds with thiol group-containing acids and the above-mentioned polyester prepared from (a) at least one polycarboxylic acid or reactive derivatives thereof, (b) at least one polyol, and (c) at least one thiol-functional carboxylic acid. The most preferred thiol-functional compound is pentaerythritol tetrakis (3-mercapto propionate).

Suitable catalysts for thiol/isocyanate cross-linking are for instance Lewis bases comprising at least one organic compound comprising an ion of a metal of Groups 3 to 13 of the Periodic Table. The organic metal compounds comprise metal salts and/or complexes of organic compounds. The organic compounds are groups having 2 to 40 carbon atoms, optionally comprising atoms such as O, N, and S. The metal salts may comprise carboxylate anions. Examples thereof include propionate, butyrate, pentanoate, 2-ethyl hexanoate, naphthenate, oxalate, malonate, succinate, glutamate, and adipate. The metal complexes comprise ligands selected from the group of beta-diketones, alkyl acetoacetates, alcoholates, and combinations thereof. Examples thereof include acetyl acetone (2,4-pentanedione), 2,4-heptanedione, 6-methyl-2, 4-heptadione, 2,4-octanedione, propoxide, isopropoxide, and butoxide. Examples of metals include aluminium, titanium, zirconium, and hafnium. Examples of metal complexes include aluminium complexed with 2,4-pentanedione (K-KAT® XC5218 ex King Industries), aluminium triacetyl acetonate, zirconium tetraacetyl acetonate, zirconium tetrabutoxide (Tyzor® NBZ ex Dupont), titanium tetrabutoxide (Tyzor® TBT ex Dupont), zirconium complexed with 6-methyl-2,4-heptadione, K-KAT® XC6212 ex King Industries, aluminium triisopropoxide, and titanium diisopropoxide bis-2,4(pentadionate) (Tyzor® AA ex DuPont). These catalysts may be used in an amount of 0.01 to 10 wt. % on solid curable material, preferably 0.1 to 5 wt. %.

Cross-linking of the reactive compounds in the paint composition can alternatively be based on Michael addition. In such a system, an unsaturated binder component, for instance an acryloyl-functional polymer, is reacted with a compound comprising acidic C—H groups. The unsaturated polymer may comprise at least one electron-withdrawing functionality linked to a carbon atom of the unsaturated bond. In the compound comprising two or more olefinically unsaturated groups, the unsaturated groups comprise at least one electron-withdrawing functional group linked to a carbon atom of the unsaturated group. The unsaturated bond may be a double or a triple bond. The electron-withdrawing group or groups may comprise carbonyl, carboxyl, ester, nitryl, cyanide, acrylamide or alkoxy functionality. Optionally non-electron-withdrawing groups may be present such as hydrogen or linear or branched alkyl, cycloalkyl, alkenyl, cyclo-alkenyl, alkynyl, cyclo-alkynyl, aryl or combinations thereof, which may be optionally substituted with various functionalities, such as hydroxy groups. The unsaturated binder component can be derived from an unsaturated carboxylic acid having 2 to 10, preferably 3 to 6, carbon atoms. The carboxylic acid may be mono- or polyunsaturated and may be a monocarboxylic or polycarboxylic acid. Examples of suitable carboxylic acids are cinnamic acid, citraconic acid or its anhydride, mesaconic acid, fumaric acid, maleic acid, propargylic acid, dehydrolevulinic acid, and itaconic acid or its anhydride. Acrylic acid, methacrylic acid, maleic acid or its anhydride, are preferred. A suitable example of a compound comprising an acrylic ester group is trimethylol propane triacrylate. Polyesters of diethyl maleate with diols, such as 1,5-pentane diol, 1,3-propane diol and/or 2-butyl-2-ethyl propane diol, or the reaction product of an epoxy-functional compound, such as Cardura® E10 (an aliphatic epoxy compound available from Shell Chemical Company), the trimer of isophorone diisocyanate, e.g., Vestanat® T1890 E, available from Hüls, and isobutyl monomaleate, are also suitable. Other suitable examples are the reaction product of maleic anhydride and dipentaerythritol, or the reaction product of maleic anhydride, isophorone diisocyanate, and butanol. Alternatively, the unsaturated binder component can be derived from an unsaturated ketone, such as divinyl ketone or dibenzal acetone. Unsaturated nitriles, for example maleic acid mononitrile-monoesters of polyhydric alcohols, are also suitable, as are alkylidene malonic acid esters or cyanoacrylic acid esters.

Compounds comprising an acidic C—H group include for instance malonates, acetoacetates, beta-diketones, beta-keto esters, beta-keto nitriles or nitro compounds.

Suitable catalysts for Michael additions include Lewis bases having a pKa of 12 or higher, such as quaternary ammonium compounds, trimethyl benzyl hydroxide ammonium, tetramethyl guanidine, diazo-bicyclo-undecene, and diazo-bicyclo-nonene.

Alternatively, use can be made of a cross-linking chemistry rather similar to the Michael addition but using thiol groups to provide the active hydrogen. Such thio-Michael systems are for instance described in EP-A 0 160 824 and in WO 00/64959. The polythiols described above for isocyanate-based cross-linking are also suitable for use in these thio-Michael systems. Similarly, the polyunsaturated compounds described above for cross-linking based on the classic Michael addition are also suitable for use in thio-Michael systems.

Suitable catalysts for thio-Michael cross-linking include the Lewis bases that are described above for Michael addition-based cross-linking. Alternatively, weaker bases can also be used, such as primary or secondary amines, aldimines, ketimines, enamines, oxazolidines or mixtures thereof. Examples of primary amines that are suitable as a catalyst are isophorone diamine and butyl amine. A suitable secondary amine is for instance di-octyl amine. Examples are aldimines of isophorone diamine with n-nonyl aldehyde, n-octyl aldehyde, 2-ethylhexyl aldehyde, isobutyraldehyde; monofunctional aldimines such as n-octyl- or n-nonyl amine with octyl aldehyde, nonyl aldehyde or 2-ethyl hexyl aldehyde; or the condensation products of primary amino groups with acetaldehyde, propionaldehyde, isobutyraldehyde, octyl aldehyde or nonyl aldehyde. Suitable ketimines are for example tri-amino nonane-tris ethylamyl ketimine or the condensation products of primary amino groups with for instance acetone, methylethyl ketone, methylisobutyl ketone, methylisoamyl ketone, ethylamyl ketone, or cyclohexanone. The use of oxazolidines, enamines or mixtures thereof as a catalyst results in a moisture-curable composition. The reaction starts slowly when the compound comprising the oxazolidine or enamine group is added to the mixture. After contact with moisture, the oxazolidine or enamine is converted by hydrolysis into a primary or secondary amine. As a result of the presence of the primary or secondary amines, the reaction is gradually accelerated. An example of a suitable enamine is 1-pyrrolidino-1-cyclohexene. A suitable tertiary amine is dimethyl amino ethanol.

A further possible cross-linking system for a coating composition according to the invention is one based on cross-linking of epoxy-functional compounds with epoxy-reactive compounds, such as binders having carboxylic acid groups, polyamines and/or polythiols. Suitable polyepoxies are for instance Epikote® 235, 255, 1001, 1004, or 1009, all available from Shell. The polythiols listed above for the NCO-thiol curing systems are also suitable for systems based on epoxy-thiol curing. A suitable catalyst for epoxy-thiol or epoxy-amine curing is for instance 1,4-diazabicyclo[2,2,2]octane. Suitable examples of catalysts for epoxy-acid curing are for example tetraalkyl ammonium iodide, tetraalkyl ammonium bromide, and chromium III 2-ethyl hexanoate.

The liquid phase may be water borne or solvent borne, but particularly for cases where the paint does not need to be sprayable, the composition may be solvent-free.

The liquid phase may further contain the usual additives, such as fillers, pigments, flow additives, rheology modifiers, defoamers, UV absorbers, or other additives. Vitreous beads may be added, e.g. if the composition is used as a road marking paint.

The second phase of the coating composition according to the present invention is a powder material suitable for catalysing curing of the liquid phase. The powder material may for instance comprise a compound capable of in situ formation of a base when mixed into the liquid phase. To this end, the liquid phase may for example comprise a phosphine compound, whereas the powder phase may comprise one or more compounds having an electron-deficient olefin-functional group, or the other way around if so desired. When the phosphine compound is exposed to the olefin compound, a basic complex is formed which in turn catalyses the cross-linking reaction. A suitable phosphine compound is for instance triphenyl phosphine. Suitable electron-deficient olefins are for instance acrylates, methacrylates, maleates, fumarates, and maleinimides.

Alternatively, the powder material can comprise one or more compounds which are basic per se, such as the above listed amine-functional compounds.

The powder material may comprise a carrier material, such as a silicate, carrying the catalysing compounds. Suitable silicate carriers are for example sand, vitreous beads, diatomaceous earth, and zeolites. Suitable non-silicate carriers are for instance barium sulphate, chalk, organic pigments or inorganic pigments, such as titanium dioxide. The activating compounds can be adsorbed onto the surface of the carrier material particles.

If sand is used as a carrier material, the roughness of the paint layer after curing can be increased by using a high average particle size. This can be combined with the use of finer grades of sand having a smaller average particle size to fill the intermediate space between the larger particles and to increase the specific surface to which the catalyst compound can attach iself. In a suitable embodiment, the powder comprises a mixture of sand having an average particle size above 200 micrometers and a fine sand having an average particle size below 100 micrometers. In a more specific example of a suitable embodiment, the powder comprises more than about 60 wt. % of sand having an average particle size between 300-800 micrometers, 15-30 wt. % of quartz sand having an average particle size of 20-90 micrometers, and a fine grade quartz sand having an average particle size below 10 micrometers, preferably about 3 micrometers.

The powder material may for instance comprise up to about 8 wt. % of the catalysing compound, although in particular cases up to about 5 wt. %, or up to about 3 wt. % may be sufficient.

Instead of using a powder carrier material, an activating compound can be used which is itself a solid powder material. Suitable examples are zinc oxide, calcium oxide, calcium carbonate or zirconia treated titanium dioxide, such as Tioxide® TR92, available from Huntsman.

The invention also relates to a method of applying a coating composition curable by cross-linking chemistry based on electron pair exchange, wherein after application of a layer of the coating composition on a substrate, a powder material comprising one or more cross-linking activating compounds is sprinkled over the wet layer. The powder material can be sprinkled over the paint layer by hand. Superfluous powder material may be swept away. If so desired, sand blasters or blowers may be used.

If the thickness of the freshly applied coating layer is less than the particle size of at least a part of the powder material, the powder particles will protrude from the fresh paint layer. A second coating layer can then be applied after sprinkling the powder material over the first coating layer. Since the particles sprinkled over the first layer will protrude into the layer applied second, the catalysing compound will also activate curing in the second layer.

The method according to the present invention is particularly suitable for application of floor coatings having rough surfaces, such as for access balconies for deck access flats, road marking paints, or coatings for wearing course surfaces, e.g. garage floors or parking garage floors.

The invention is further described and illustrated by the following examples. In the examples, all amounts are given in percentages by weight unless indicated otherwise.

EXAMPLE 1

A two-component coating composition was prepared. The first component comprised pentaerythritol tetrakis 3-mercaptopropionate (PET-3-MP, available form Bruno Bock), 20 wt. % titanium dioxide (Tipure® R902-38, available from Dupont), about 0.6 wt. % of a defoamer (Byk® A525), about 0.1 wt. % of a surfactant (Byk® 307), and 1 wt. % triphenyl phosphine (available from Rhodia) in xylene (ratio 1:2). The second component comprised a polyisocyanate (Tolonate® HDT LV, available from Rhodia).

The components were stoichiometrically mixed before application. After application with a roller, a powder material was sprinkled over the applied paint layer. The powder comprised: 6 parts of sand having an average particle size ranging from 0.3-0.8 mm, 2 parts of a rough grade quartz sand having an average particle size of about 50 micrometers, and a fine grade quartz sand having an average particle size of about 3 micrometers. Furthermore, the powder material comprised 2 wt. % of an acrylate (Actilane® 411, available from Akcros). A substantial part of the particles protruded from the paint layer.

Curing was completed within 10 minutes. Excess sand was removed and a second layer of paint was applied on top of the cured layer with a roller. Curing of the second layer occurred within 30 minutes.

EXAMPLE 2

A two-component coating composition was prepared. The first component comprised pentaerythritol tetrakis 3-mercaptopropionate, about 0.6 wt. % of a defoamer (Byk® A525), about 0.1 wt. % of a surfactant (Byk® 307), and 10 wt. % titanium dioxide (Tipure® R902-38). The second component comprised a polyisocyanate (Tolonate® HDT LV).

The components were stoichiometrically mixed before application. After application with a roller, a powder material was sprinkled over the fresh, uncured paint layer. The powder comprised: 9 parts of glass beads (050-40-216-A2, available from Solvitec) having an average particle size of about 40 micrometers and 1 part of a fine grade quartz sand having an average particle size of about 3 micrometers. Furthermore, the powder material comprised 0.5 wt. % triethanolamine.

Curing was obtained within 5 minutes.

EXAMPLE 3

A two-component coating composition was prepared. The first component comprised pentaerythritol tetrakis 3-mercaptopropionate, 14 wt. % titanium dioxide (Tipure® R902-38, available from Dupont), about 0.6 wt. % of a defoamer (Byk® A525), about 0.1 wt. % of a surfactant (Byk® 307). The second component comprised a polyisocyanate (Tolonate® HDT LV).

The components were stoichiometrically mixed before application. After application, a powder material was sprinkled over the applied paint layer. The powder comprised: 9 parts of sand having an average particle size ranging from 0.3-0.8 mm and 1 part Tioxide® TR92 (commercially available from Huntsman), a zirconia-treated TiO2.

Curing was obtained within 30 minutes.

EXAMPLE 4

A two-component coating composition was prepared. The first component comprised pentaerythritol tetrakis 3-mercaptopropionate, about 0.6 wt. % of a defoamer (Byk® A525), 20 wt. % titanium dioxide (Tipure® R902-38, available from Dupont), and about 0.1 wt. % of a surfactant (Byk® 307). The second component comprised a polyisocyanate (Tolonate® HDT LV).

The components were stoichiometrically mixed before application. After application, a powder material was sprinkled over the applied paint layer. The powder consisted mainly of sand having an average particle size ranging from 0.2-0.6 mm. Furthermore, the powder material comprised 0.5 wt. % zirconium butoxide.

Curing was obtained within 30 minutes.

EXAMPLE 5

A two-component coating composition was prepared. The first component comprised pentaerythritol tetrakis 3-mercaptopropionate, 20 wt. % titanium dioxide (Tipure® R902-38, available from Dupont), about 0.6 wt. % of a defoamer (Byk® A525), and about 0.1 wt. % of a surfactant (Byk® 307). The second component comprised a polyisocyanate (Tolonate® HDT LV).

The components were stoichiometrically mixed before application. After application, $CaCO_3$ was sprinkled over the applied paint layer.

Curing was obtained within 60 minutes.

EXAMPLE 6

A two-component coating composition was prepared. The first component comprised pentaerythritol tetrakis 3-mercaptopropionate, 20 wt. % titanium dioxide (Tipure® R902-38, available from Dupont), about 0.6 wt. % of a defoamer (Byk® A525), and about 0.1 wt. % of a surfactant (Byk® 307). The second component comprised a polyfunctional acrylate (Actilane® 433, available from Akcros).

The components were stoichiometrically mixed before application. After application, a powder material was sprinkled over the applied paint layer. The powder was a sand having an average particle size ranging from 0.2-0.6 mm. Furthermore, the powder material comprised 0.5 wt. % oxazolidine (Incozol-2®, available from Industrial Copolymers Limited).

Curing was obtained within 30 minutes.

EXAMPLE 7

A two-component coating composition was prepared. The first component comprised a polyfunctional acetoacetate (AATMP®, available from Lonza Group), 20 wt. % titanium dioxide (Tipure® R902-38, available from Dupont), about 0.6 wt. % of a defoamer (Byk® A525), and about 0.1 wt. % of a surfactant (Byk® 307). The second component comprised a polyfunctional acrylate (Actilane® 433, available from Akcros).

The components were stoichiometrically mixed before application. After application, a powder material (sand) was sprinkled over the applied paint layer. The powder had an average particle size ranging from 0.2-0.6 mm. Furthermore, the powder material comprised 0.5 wt % 1,8-diaza-bicyclo [5.4.0]undec-7-ene.

Curing was obtained within 5 minutes.

EXAMPLE 8

A two-component coating composition was prepared. The first component comprised pentaerythritol tetrakis 3-mercaptopropionate, 20 wt. % titanium dioxide (Tipure® R902-38, available from Dupont), about 0.6 wt. % of a defoamer (Byk® A525), and about 0.1 wt. % of a surfactant (Byk® 307). The second component comprised a polyfunctional epoxy (Epikote® 154, available from Shell).

The components were stoichiometrically mixed before application. After application, a powder material (sand) was sprinkled over the applied paint layer. The powder had an average particle size ranging from 0.2-0.6 mm. Furthermore, the powder material comprised 1 wt. % 1,4-diazabicyclo-[2, 2,2]octane in ethanol (ratio: 1:2).

Curing was obtained within 15 minutes.

The invention claimed is:

1. A two-phase coating system comprising:
    at least one catalyst;
    a liquid phase, comprising one or more polymer binders cross-linkable by polar reaction; and
    a separate dry sprinkleable powder phase, comprising a solid carrier material and at least a part of a precursor of the catalyst which forms the catalyst in reaction with a co-reactive compound in the liquid phase; wherein
    the separate dry sprinkleable powder phase is formulated for sprinkling on a coating of the liquid phase, after application of a coating of the liquid phase to a substrate; and
    wherein the liquid phase comprises a compound which is reactive with the precursor in the powder phase to form a Lewis base or Lewis acid after the liquid phase is exposed to the powder phase.

2. The two-phase coating system according to claim 1, wherein at least one catalyst includes a Lewis acid or Lewis base.

3. The two-phase coating system according to claim 1, wherein the liquid phase is a two-component composition, the first component comprising one or more polyisocyanates and the second component comprising a polythiol, polyol, polyamine or mixtures thereof.

4. The two-phase coating system according to claim 1, wherein the liquid phase is a two-component composition, the first component comprising one or more polyepoxies and the second component comprising one or more polythiols.

5. The two-phase coating system according to claim 1, wherein the liquid phase is a two-component composition, the first component comprising a polyunsaturated binder and at least one electron-withdrawing group linked to a carbon atom of at least one of the unsaturated bonds, the second component comprising a polythiol and/or a compound comprising acidic CH groups.

6. The two-phase coating system according to claim 1, wherein the powder phase comprises one or more phosphine compounds, and the liquid phase comprises one or more electron-deficient olefins.

7. The two-phase coating system according to claim 1, wherein the powder phase comprises one or more amines.

8. The two-phase coating system according to claim 1, wherein the powder phase comprises the solid carrier material in powder form having one or more activating compounds adsorbed to its surface.

9. The two-phase coating system according to claim 8, wherein the carrier material is sand, diatomaceous earth, zeolite, vitreous beads, barium sulphate, chalk, pigment, or mixtures thereof.

10. The two-phase coating system according to claim 9, wherein the carrier material is titanium dioxide coated with a zirconium compound.

11. The two-phase coating system according to claim 8, wherein the carrier material comprises a mixture of sand having an average particle size above 200 micrometers and a fine sand having an average particle size below 100 micrometers.

12. The two-phase coating system according to claim 11, wherein the powder phase comprises more than about 60 wt. % of sand having an average particle size between 300-800 micrometers, 15-30 wt. % of quartz sand having an average particle size of 20-90 micrometers, and a fine grade quartz sand having an average particle size below 10 micrometers.

13. The two-phase coating system according to claim 1, wherein the powder phase comprises up to about 8 wt. % of the precursor of the catalyst.

14. A Method of applying a coating composition comprising in a liquid phase one or more polymer binders crosslinkable by polar reaction and in a separate dry powder phase at least one precursor of a catalyst which forms the catalyst in reaction with a co-reactive compound in the liquid phase the method comprising applying a layer of the liquid phase on a substrate, sprinkling the powder phase over the wet liquid phase layer on the substrate, wherein the liquid phase comprises a compound which is reactive with the precursor in the powder phase to form a Lewis base or Lewis acid after the liquid phase is exposed to the powder phase.

15. Method according to claim 14, further comprising: after sprinkling the powder phase over the wet liquid phase layer, applying a second layer of the liquid phase; wherein the thickness of the applied layer of liquid phase on the substrate is less than the particle size of at least a part of the powder phase material.

16. The two-phase coating system according to claim 11, wherein the powder phase comprises more than about 60 wt. % of sand having an average particle size between 300-800 micrometers, 15-30 wt. % of quartz sand having an average particle size of 20-90 micrometers, and a fine grade quartz sand having an average particle size below about 3 micrometers.

17. The two-phase coating system according to claim 13, wherein the powder phase comprises up to about 5 wt. % of the precursor of the catalyst.

18. The two-phase coating system according to claim 13, wherein the powder phase comprises up to about 3 wt. % of the precursor of the catalyst.

* * * * *